Figure 1:
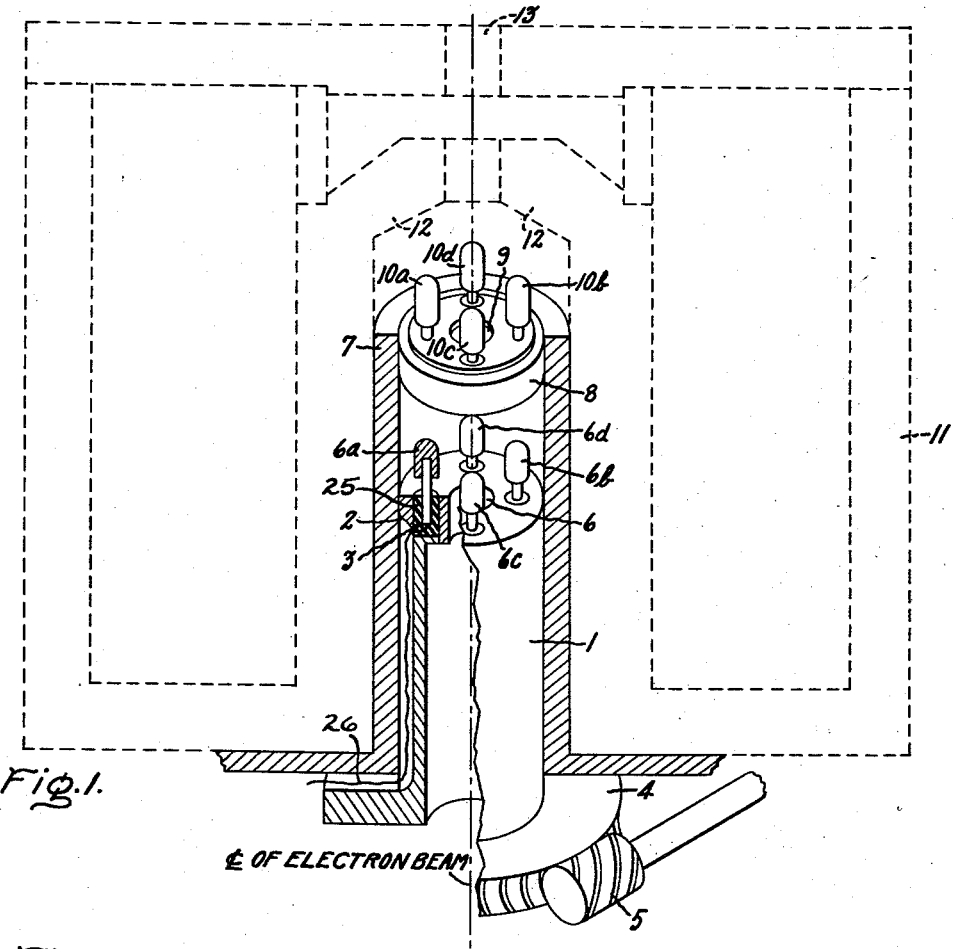

Feb. 23, 1960    M. E. HAINE ET AL    2,926,254
ELECTRON LENSES
Filed Aug. 11, 1955

℄ OF ELECTRON BEAM

Inventors:
Michael E. Haine,
Thomas Mulvey,
by Urban H. Faubion
Their Attorney

United States Patent Office 2,926,254
Patented Feb. 23, 1960

2,926,254

ELECTRON LENSES

Michael E. Haine, Sulhamstead, and Thomas Mulvey, Reading, England, assignors to Metropolitan-Vickers Electrical Company Limited, London, England, a British company Application August 11, 1955, Serial No. 527,736

4 Claims. (Cl. 250—49.5)

This invention relates to electron lenses and is particularly applicable to such lenses for electron microscopes.

It is well known that a very small departure from axial symmetry in the pole pieces of an electron microscope objective lens introduces an astigmatic component to the lens. The astigmatism is a limitation on the resolving power of the instrument.

It is possible to effect a degree of correction of astigmatism by means of a relatively weak adjusting lens which may be either magnetic or electrostatic and which may be rotated about the axis of the microscope (the electron beam path) to the position giving maximum correction. However, it is found that the amount of correction possible with such an arrangement is limited, such limitation being principally due to the difficulty of physically positioning the lens angularly with a sufficient degree of accuracy. In practice, it has been found difficult to reduce the astigmatism by a factor greater than ten times.

Accordingly, it is an object of this invention to provide an improved correcting lens arrangement which gives a higher degree of correction than previously known arrangements.

Another object of this invention is to provide an improved correcting lens arrangement utilizing at least a pair of electron lenses both having electrical and physical adjustments to correct the system focusing lens for astigmatism.

In accordance with the present invention, an astigmatism correcting lens system for an electron beam lens is provided which comprises at least two correcting lenses displaced axially along the instrument (axially along the electron beam path of an electron microscope) and means for independently adjusting and providing different degrees of correction for each correcting lens.

In accordance with the preferred arrangement, one of the lenses gives a coarse adjustment, and the other gives a fine adjustment. The lens which gives the coarse adjustment may be preset in position in the instrument while the fine adjustment lens may have its position adjusted from outside the instrument. However, means is provided for continually adjusting the electrical strength and the focusing of at least one of the lenses from an external position.

Figure 3:
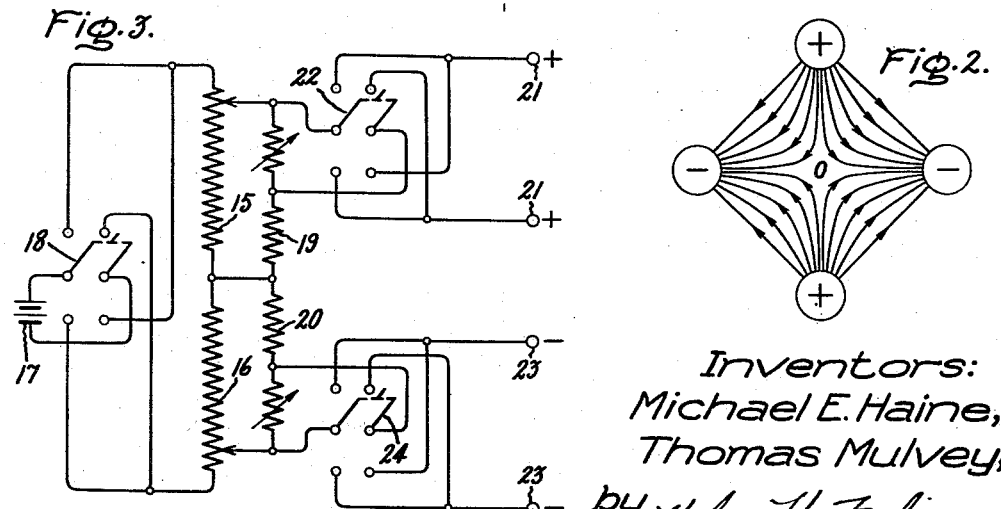
Figure 2:
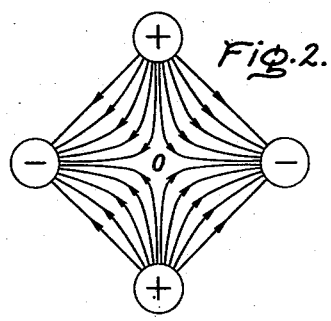

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which Fig. 1 is a partially broken away perspective view of a correcting lens arrangement embodying the present invention positioned in an objective lens of an electron microscope;

Fig. 2 illustrates the electrostatic field distribution between the poles of each correcting lens; and Fig. 3 diagrammatically illustrates one electrical circuit which may be used to provide the amplitude and centering adjustment for the four pole astigmatism correcting lenses illustrated.

Adverting to Fig. 1 of the drawing, the first correcting lens, i.e., the lens which provides the fine adjustment, comprises a cylindrical body 1 which is provided with a cross plate 2 at its upper end which has a center aperture 3 and an external flange 4 at its lower end.

In order that the fine adjusting lens may be rotated from outside the instrument, a worm drive 5 or other suitable mechanism is made to engage teeth on the outer periphery of the external flange 4. Thus, rotation of the worm drive 5 rotates the cylindrical body 1 and hence, the entire fine correcting lens about its longitudinal axis. The upper face of the cross plate 2 is provided with four rod electrodes 6a, 6b, 6c, and 6d which extend parallel to the electron beam axis of the instrument and are equally spaced from the longitudinal axis of the cylinder 1 and positioned in such a manner that each electrode is equally spaced from the two adjacent electrodes. In other words, the rod electrodes are mounted on a circle centered on the axis of the electron beam path with the successive electrodes being spaced apart by equal distances. Each diagonally opposite pair of electrodes is supplied with opposite potentials.

The second correcting lens, which may be referred to as the coarse correcting lens, also has a cylindrical body 7 with a cross plate 8 at the top thereof which corresponds to the cross plate 2 previously referred to. The center aperture in the cross plate 8 is designated by the numeral 9 and four electrodes 10a, 10b, 10c, and 10d are positioned on the cross plate 8 in the same manner as the electrodes 6a, 6b, 6c, and 6d are positioned on the cross plate 2.

The cylinder 7 of the coarse lens is positioned around the cylinder 1 of the fine correcting lens and the two correcting lenses are positioned within the normal objective lens 11 shown in dash lines so that the upper electrodes 10a, 10b, 10c, and 10d of the coarse correcting lens are a little below the pole pieces 12 of the objective lens. With this arrangement, the longitudinal axis of the cylinders 1 and 7 of the two corrective lenses are in physical alignment with each other and the apertures 6 and 9 of the two corrective lenses are in physical alignment with the aperture 13 in the objective lens and, consequently, with the center line of the electron beam path marked ℄.

Since the diagrammatically opposite pairs of electrodes are connected together and supplied with voltage having opposite potentials, the electrostatic field distribution between the electrode will be as shown in Fig. 2 of the drawing. Electrons traveling through this field are accelerated toward the one diagonal. The electron acceleration is produced by the full magnitude of the field and not a small fringing component, and as a result the lens action is stronger than in a slit system. The orientation angle is adjusted by physical rotation of each correcting lens or of the whole correcting lens assembly. The positioning of a given corrector unit below the objective lens introduces a small amount of distortion in the final image and requires a means of centering in case the objective lens axis does not pass through the neutral point in the center of the corrector electrodes. The distortion produced may be corrected, i.e., the centering achieved by the simple expedient of introducing a voltage between the diagonal electrodes, which voltage is adjustable so that the neutral point may be shifted to coincide with the lens axis.

An electrical arrangement which may be utilized to accomplish the shift is illustrated in Fig. 3 of the drawing. As illustrated, a pair of series connected potentiometers 15 and 16 are connected to receive the output potential of a battery 17. A reversing switch 18 is provided between the battery 17 and potentiometers 16 and 17 to reverse the polarity of the voltage across the potentiometers. As illustrated, an output potentiometer 19 is connected between a tap and one end of potentiometer 15 and an output potentiometer 20 is connected between the tap and one end of the potentiometer 16. The taps on the potentiometers 15 and 16 may be varied in order to vary the voltage applied to the output potentiometers 19 and 20. When the reversing switch 17 is in its upper position, as illustrated, the potentiometer 15 is at a higher potential than the potentiometer 16 and the output potentiometer 19 is at a higher potential than output potentiometer 20. Thus, the positive electrodes 21 are supplied through a reversing switch 22 from a portion of the output potentiometer 19 and the negative electrodes 23 are supplied through a reversing switch 24 from a portion of the output potentiometer 20. The output potentiometers 19 and 20 or at least the part of these potentiometers which supply the potential to the positive and negative electrodes 21 and 23 respectively are preferably made variable in order to vary the potential on the electrodes. The reversing switches 18, 22, and 24 are merely provided for the purpose of extending the range of adjustment of the circuit. Obviously, other circuit arrangements could be used.

In the correcting lens arrangement illustrated, the rod electrodes 6a, 6b, 6c, and 6d of the fine adjusting correcting lens are insulated from the cross plate 2 as by an insulating medium 25, shown in the cutaway of rod electrode 6a, and leads are brought out through the insulating medium as illustrated by the lead 26, also illustrated as being connected to rod electrode 6a. The lead 26 and other similar leads are adapted to be connected directly to the reversing switches 22 and 24 in the output of the potential supplying circuit of Fig. 3.

In practice, the rod electrodes 10a, 10b, 10c, and 10d of the coarse adjusting correcting lens may have a potential supply circuit such as the one illustrated in Fig. 3 or, as illustrated, two of the diagonally opposite rod electrodes 10a and 10b may be connected directly to the cross plate 8 and, therefore, be at ground potential and the other two electrodes 10c and 10d be connected to receive a potential as from one portion of the circuit of Fig. 3. For example, the two electrodes 10b and 10c may be connected to receive the output from either the reversing switch 22 or 24, depending upon the position of the reversing switch 18 and the polarity relative to ground that it is desired to have on the electrodes.

In the embodiment illustrated, the operation of the upper or coarse adjusting correcting lens is intended to be preset before the electron microscope is assembled to provide an approximate correction. The lower or fine adjusting correcting lens is continually adjustable from outside the instrument, both physically and electrically, to provide a finer degree of correction. That is to say, that the fine adjusting correcting lens is rotatable about its longitudinal axis by means of the worm drive 5 to provide a mechanical adjustment and the potential on the electrodes of the fine adjusting lens is adjustable externally by use of the reversing switches 18, 22, and 24, the taps on the potentiometer 16, and the variable portions of the potentiometers 19 and 20. Clearly, the electrical strength of the lens will at all times be adjustable from outside the instrument with this arrangement.

While one embodiment of this invention has been shown, it is to be understood that the invention is not limited thereto since many modifications both in the circuit arrangement and in the instrumentalities employed may be made. For example, in the arrangement shown there are only two correcting lenses, and it will be clear than the invention is not so limited but that additional correcting lenses may be employed. Also, it is clear that provision may be made for rotating both or all of the correcting lenses and for adjusting the potentials applied to the electrodes of all of the correcting lenses. Any combination of these arrangements may also be employed. It is contemplated that the appended claims will cover any such modifications as come within the true spirit and scope of the invention.

What we claim as new and desire to secure by Letters Patent of the United States is:

1. An electronic correction lens assembly for use with an electron beam focusing lens, comprising a pair of electrostatic correcting lenses displaced axially along the path of the electron beam, each of said correcting lenses comprising a plurality of rod electrodes having their longitudinal axes parallel to the path of the electron beam and mounted on a circle centered on the axis of the electron beam path, means to supply diagonally opposite pairs of electrodes with voltages of opposite potential, means for independently varying the voltage between said electrodes, and means for mechanically rotating each of said correcting lenses with respect to the electron beam path independently of the other.

2. An electronic correction lens assembly for use with an electron beam focusing lens of an electron microscope comprising a pair of electrostatic correcting lenses displaced axially along the path of the electron beam, each of said correcting lenses comprising four rod electrodes having their longitudinal axes parallel to the path of the electron beam and mounted on a circle centered on the axis of the electron beam path, means to supply diagonally opposite pairs of electrodes with voltages of opposite potential, means for independently varying the voltage between said electrodes, and means for mechanically rotating each of said correcting lenses independently with respect to the electron beam path, said means for varying the voltage between electrode and said means for mechanically rotating at least one of said correcting lenses being outside the electron microscope.

3. An anastigmatic lens assembly for focusing an electron beam comprising a hollow cylinder whose axis is substantially coincident with the axis of the beam, a first electrostatic field lens mounted in said cylinder, a second electrostatic field lens mounted for rotation within said cylinder, a focusing lens axially displaced from said first lens, and a structure surrounding said cylinder for electrically exciting said focusing lens.

4. An anastigmatic electron lens assembly comprising a focusing lens of the magnetic field type having energizing structure associated therewith, a first astigmatism correcting electrostatic field lens coaxially within said energizing structure, a second astigmatism correcting electrostatic field lens axially spaced from said first lens within said structure, and means for rotating said electrostatic lenses relative to each other about the axis of said focusing lens, said electrostatic field lenses each including opposed pairs of electrodes arranged in a circle concentrically about the axis of the magnetic field lens, and means for applying a variable voltage to the electrodes of each electrostatic field lens independently.

References Cited in the file of this patent

UNITED STATES PATENTS

| | | |
|---|---|---|
| 2,323,328 | Hillier | July 6, 1943 |
| 2,424,965 | Brillouin | Aug. 5, 1947 |
| 2,509,254 | Selgin | May 30, 1950 |
| 2,547,994 | Bertein | Apr. 10, 1951 |
| 2,646,522 | Shaw et al. | July 21, 1953 |